(12) United States Patent  (10) Patent No.: US 8,355,539 B2
Tan et al.  (45) Date of Patent: Jan. 15, 2013

(54) RADAR GUIDED VISION SYSTEM FOR VEHICLE VALIDATION AND VEHICLE MOTION CHARACTERIZATION

(75) Inventors: Yi Tan, Princeton, NJ (US); Feng Han, Princeton, NJ (US); Jayan Eledath, Princeton, NJ (US); Rakesh Kumar, Princeton, NJ (US); Faroog Abdel-kareem Ibrahim, Dearborn Heights, MI (US)

(73) Assignees: SRI International, Menlo Park, CA (US); Visteon Global Technologies, Inc., Van Buren Township, MI (US)

( * ) Notice: Subject to any disclaimer, the term of this patent is extended or adjusted under 35 U.S.C. 154(b) by 1238 days.

(21) Appl. No.: 12/146,897

(22) Filed: Jun. 26, 2008

(65) Prior Publication Data

US 2009/0067675 A1    Mar. 12, 2009

Related U.S. Application Data

(60) Provisional application No. 60/970,618, filed on Sep. 7, 2007.

(51) Int. Cl.
    *G06K 9/00* (2006.01)
(52) U.S. Cl. .................................. 382/104; 382/100
(58) Field of Classification Search .................. 382/100, 382/104
    See application file for complete search history.

(56) References Cited

U.S. PATENT DOCUMENTS

| | | | |
|---|---|---|---|
| 5,351,044 A | * | 9/1994 | Mathur et al. ................ 340/901 |
| 5,517,412 A | * | 5/1996 | Unoura ............................ 701/23 |
| 5,892,855 A | * | 4/1999 | Kakinami et al. ............. 382/291 |
| 6,343,247 B2 | * | 1/2002 | Jitsukata et al. ................ 701/28 |
| 6,859,144 B2 | * | 2/2005 | Newman et al. ............... 340/576 |

(Continued)

FOREIGN PATENT DOCUMENTS

JP    2002150302 A    *    5/2002

(Continued)

OTHER PUBLICATIONS

E. Segawa et al. "Preceding Vehicle Detection Using Stereo Images and Non-Scanning Millimeter-Wave Radar." IEICE Transactions on Information and Systems (Jul. 2006), vol. E89-D, pp. 2101-2108.

(Continued)

*Primary Examiner* — Brian P Werner
*Assistant Examiner* — Shefali Goradia
(74) *Attorney, Agent, or Firm* — Moser Taboada

(57) ABSTRACT

A method for determining whether a target vehicle in front of a host vehicle intends to change lanes using radar data and image data is disclosed, comprising the steps of processing the image data to detect the boundaries of the lane of the host vehicle; estimating a ground plane by determining a projected vanishing point of the detected lane boundaries; using a camera projection matrix to map the target vehicle from the radar data to image coordinates; and determining lane change intentions of the target vehicle based on a moving trajectory and an appearance change of the target vehicle. Determining lane change intentions based on a moving trajectory of the target vehicle is based on vehicle motion trajectory relative to the center of the lane such that the relative distance of the target vehicle from the center of the lane follows a predetermined trend. Determining lane change intentions based on an appearance change of the target vehicle is based on a template that tracks changes to the appearance of the rear part of the target vehicle due to rotation.

19 Claims, 9 Drawing Sheets

U.S. PATENT DOCUMENTS

| | | | | |
|---|---|---|---|---|
| 7,418,372 B2 * | 8/2008 | Nishira et al. | ............... | 703/2 |
| 8,050,458 B2 * | 11/2011 | Azuma | ............... | 382/104 |
| 2006/0095193 A1 * | 5/2006 | Nishira et al. | ............... | 701/96 |
| 2007/0080825 A1 * | 4/2007 | Shiller | ............... | 340/903 |
| 2008/0310680 A1 * | 12/2008 | Azuma | ............... | 382/104 |

FOREIGN PATENT DOCUMENTS

JP 2005251200 A * 9/2005

OTHER PUBLICATIONS

A. Broggi et al. "A Radar Driven Fusion with Vision for Vehicle Detection." PReVENT Fusion e-Journal (Sep. 2006), vol. 1, pp. 17-18.

J. McCall et al. "Lane Change Intent Analysis Using Robust Operators and Sparse Bayesian Learning." Proceedings of IEEE Computer Society Conference on CVPR (2005).

N. Dalal et al. "Histograms of Oriented Gradients for Human Detection." Proceedings of IEEE Computer Society Conference on CVPR (2005).

D. Lowe. "Distinctive Image Features From Scale-Invariant Keypoints." International Journal of Computer Vision (2004), pp. 91-110.

A. Sole et al. "Solid or Not Solid: Vision for Radar Target Validation." IEEE Intelligent Vehicles Symposium, Parma, Italy (2004).

D. Salvucci. "Inferring Driver Intent: A Case Study in Lane-Change Detection." Proceedings of the Human Factors Ergonomics Society 48th Annual Meeting (2004).

V. Kastrinaki et al. "A Survey of Video Processing Techniques for Traffic Applications." Image and Vision Computing (2003), Vol. 21, pp. 359-381.

U. Hofmann et al. "Radar and Vision Data Fusion for Hybrid Adaptive Cruise Control on Highways." ICVS (2001), pp. 125-138.

B. Southall et al. "Stochastic Road Shape Estimation." Proceedings of ICCV (2001), vol. 1, pp. 205-212.

M. Betke et al. "Real-Time Multiple Vehicle Detection and Tracking From a Moving Vehicle." Machine Vision and Applications (2000), vol. 12, pp. 69-83.

E. Osuna et al. "Training Support Vector Machines: an Application to Face Detection." Proceedings of the IEEE Conference on Computer Vision and Pattern Recognition (1997), pp. 130-136.

V. Vapnick. "The Nature of Statistical Learning Theory." New York: Springer-Verlag (1995), pp. 132-133.

Lucas et al. "An Iterative Image Registration Technique With an Application to Stereo Vision." International Joint Conference on Artificial Intelligence (1981), pp. 674-679.

* cited by examiner

RADAR GUIDED VISION SYSTEM FOR VEHICLE VALIDATION AND VEHICLE MOTION CHARACTERIZATION

CROSS-REFERENCE TO RELATED APPLICATIONS

This application claims the benefit of U.S. provisional patent application No. 60/970,618 filed Sep. 7, 2007, the disclosure of which is incorporated herein by reference in its entirety.

GOVERNMENT RIGHTS IN THIS INVENTION

This invention was made with U.S. government support under contract number ABGP006070035. The U.S. government has certain rights in this invention.

FIELD OF THE INVENTION

The present invention relates generally to vision systems, and more particularly, to a radar guided vision system and method for detecting the presence of a target vehicle in front of a host vehicle in the same lane of traffic and for determining whether the target vehicle intends to change lanes.

BACKGROUND OF THE INVENTION

When there is a vehicle on a highway in front of a host (i.e. following) vehicle, it is desirable for the driver of the host vehicle to know the intensions of the driver of the in-front (i.e. the target) vehicle as to whether the target vehicle intends to change lanes. If the target vehicle intends to change lanes very soon, then there is no need for the host vehicle to slow down. Unfortunately, the target vehicle may slow down before changing lanes, causing the host vehicle to brake quickly and hard.

Vehicle control and driver awareness systems such as Adaptive Cruise Control (ACC) and Forward Collision Warning (FCW) systems have been developed to aid the host driver to automatically determine the intensions of a target vehicle. Unfortunately, ACC and FCW systems exhibit poor performance when reacting to drivable stationary objects or objects that are leaving the lane of a host vehicle. In the case of ACC, the host vehicle may be forced to break as a result of detecting a stationary object that is not an obstacle. Also, it is undesirable for a host vehicle to execute hard braking when the target vehicle decelerates before leaving the same lane. In an FCW system, false alarms and nuisance alarms are common. An unacceptably high rate of false and nuisance alarms can cause the driver to turn the system off or just ignore the system warning because of lack of trust in system performance. The main source of false alarms is high objects such as overpasses, road signs, traffic lights, and hanging telephone lines. The main source for nuisance alarms is a target vehicle that starts to decelerate without performing a turn.

Under normal (unaided) driving conditions, host vehicle drivers have the ability to recognize that by the time the driver reaches a place to turn, the target vehicle has already moved away from the path of the driver. Further, drivers have the ability to adapt. Therefore, the performance of aided driving systems such as ACC and FCW can be improved when the target of interest (the target vehicle) is validated and characterized by the aid of vision data.

The use of multi-modality sensor data for intelligent vehicle applications is widely known. In A. Broggi and P. Cerri, "A radar driven fusion with vision for vehicle detection," in PReVENT Fusion e-Journal, 1:17-18, September 2006 (hereinafter "Broggi and Cerri") and in A. Sole, G. P. Stein, H. Kumon, Y. Tamatsu, and A. Shashua, "Solid or not solid: Vision for Radar Target Validation," in *IEEE Intelligent Vehicles Symposium*, Parma, Italy, Jun. 14-17, 2004 (hereinafter "Sole et al."), radar and vision systems are combined for vehicle detection and validation. However, the system of Broggi and Cerri does not update changes in the geometry of the moving target vehicle, but instead relies solely on pre-calibrated imaging geometry, which leads to inaccuracies, and further, road roughness may cause the failure of target mapping. Accuracy is also diminished when low level image features such as horizontal and vertical lines are employed in Sole et al. or when symmetry and heuristic methods are employed in Broggi and Cerri for vehicle detection. In J. C. McCall, D. Wipf, M. M. Trivedi, and B. Rao: "Lane Change Intent Analysis Using Robust Operators and Sparse Bayesian Learning," *IEEE CVPR Workshop: Machine Vision for Intelligent Vehicles*, vol. 3, pp 59-67, 2005 (hereinafter "McCall et al.") and D. D. Salvucci: "inferring driver intent: A case study in lane-change detection," *Proceedings of the Human Factors Ergonomics Society* 48th *Annual Meeting*, 2004 (hereinafter "Salvucci"), attempts are made to infer the intensions of a driver to make a lane change by using multi-modal data (e.g., road scene, CAN data, eye movement, etc.), which leads to predicting a vehicle's lane changing move ahead of time. However, McCall et al. and Salvucci are applicable only to host vehicles instead of a target vehicle. The driver in a target vehicle cannot be monitored by one or more sensors in the host vehicle in either McCall et al. or Salvucci.

Accordingly, what would be desirable, but has not yet been provided, are an accurate method and resulting system for detecting that a target vehicle is in the lane of and ahead of the host vehicle, and for determining if the target vehicle intends to change lanes.

SUMMARY OF THE INVENTION

The above-described problems are addressed and a technical solution achieved in the art by providing a method and resulting system for determining whether a target vehicle in front of a host vehicle intends to change lanes using radar data and image data, comprising the steps of processing the image data to detect the boundaries of the lane of the host vehicle; estimating a ground plane by determining a projected vanishing point of the detected lane boundaries; using a camera projection matrix to map the target vehicle from the radar data to image coordinates; and determining lane change intentions of the target vehicle based on a moving trajectory and an appearance change of the target vehicle. Determining lane change intentions based on a moving trajectory of the target vehicle is based on vehicle motion trajectory relative to the center of the lane such that the relative distance of the target vehicle from the center of the lane follows a predetermined trend. Determining lane change intentions based on an appearance change of the target vehicle is based on a template that tracks changes to the appearance of the rear part of the target vehicle due to rotation. The Kanade-Lucas-Tomasi Feature Tracker (KLT) can be used for tracking the target vehicle. The step of determining lane change intentions based on an appearance change of the target vehicle can further comprise the steps of encoding an appearance relationship between the tracked target vehicle and the template in warping parameters; feeding the warping parameters to a support vehicle machine (SVM); and using the SVM to classify the target vehicle as intending to change lanes or not intending to change lanes. A virtual lane and virtual lane boundaries are obtained when real lane boundaries cannot be obtained.

The step of processing the image data to detect the boundaries of a lane of the host vehicle can further comprise the steps of (a) extracting features from at least one image of the image data that represent potential lane boundaries; (b) calculating the Laplacian of the at least one image and applying multiple thresholds to horizontal gradients to generate tri-value outputs, wherein high positive gradients are mapped to white, high negative gradients are mapped to black, and remaining pixels are mapped to gray; (c) computing a search region in the image by projecting two elongated rectangular areas one the two sides of the host vehicle through a camera calibration matrix; (d) along every row in each of the two rectangular areas, correlating a transition with the pixels in the row; (e) selecting peaks possessing a predetermined strength as boundary feature points; (f) using a Hough transform to obtain a proposed fit of the lane boundaries to a straight line; (g) determined whether a fitness metric for a correct lane boundaries estimation exceeds a predetermined threshold; and (h) repeating steps (a)-(g) if the predetermined threshold is not exceeded, otherwise a accepting the proposed fit as genuine lane boundaries. The projected vanishing point of the detected lane boundaries is determined from the projected intersections of the accepted lane boundaries.

The method can also comprise the step of tracking the boundaries of the lane, which can further include the steps of using an Intraframe-Kalman filter to predict the position of the target vehicle in a current frame from estimates of lane boundaries in a previous frame; and applying an Interframe-Kalman filter to incorporate features within the current frame into the Intraframe-Kalman filter's estimate.

The method can also comprise the step of determining whether the target vehicle is a valid vehicle, which can include representing the target vehicle using a histogram of oriented gradient (HOG) representation; feeding the HOG representation to a support vehicle machine (SVM); and using the SVM to classify whether the target vehicle is a valid target vehicle. The step of representing the target vehicle using a histogram of oriented gradient (HOG) representation can further comprise the steps of computing the gradient magnitude and orientation at each image sample point in a region around an anchor point; splitting the region into N×N sub-regions; forming an orientation histogram for each sub-region by accumulating samples within the sub-region, weighted by gradient magnitudes; concatenating the histograms from all the sub-regions into a final HOG feature vector; and extending the HOG by incorporating spatial locality. Spatial locality can be incorporated by adding one distance dimension to an angle dimension in the binning of all the pixels within each sub-region; accumulating a local 1-D histogram of gradient directions over the pixels of a cell; and combining the histogram entries to form an extended HOG representation.

BRIEF DESCRIPTION OF THE DRAWINGS

The present invention will be more readily understood from the detailed description of an exemplary embodiment presented below considered in conjunction with the attached drawings and in which like reference numerals refer to similar elements and in which.

it is to be understood that the attached drawings are for purposes of illustrating the concepts of the invention and may not be to scale.

DETAILED DESCRIPTION OF THE INVENTION

Figure 1:
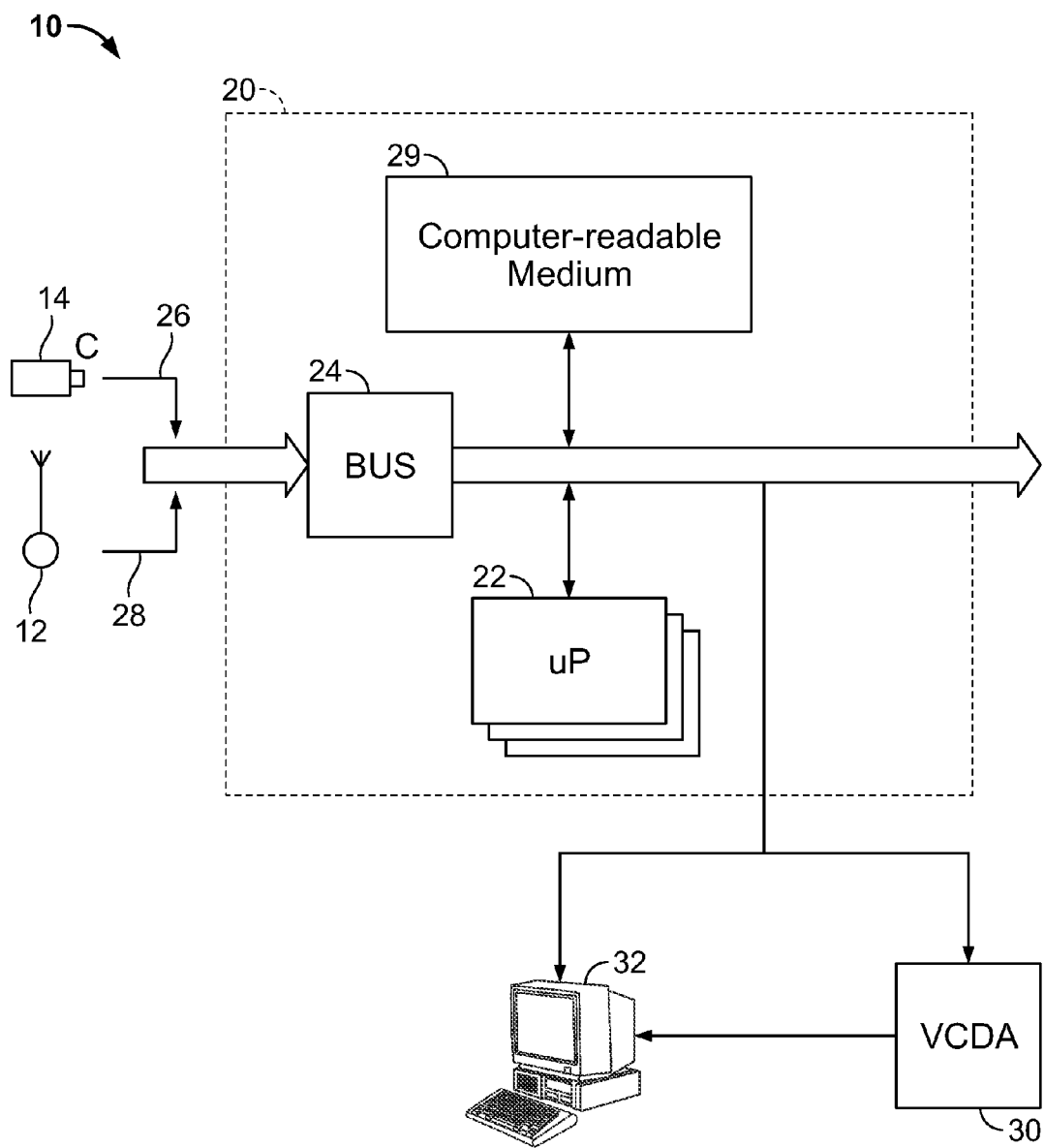
FIG. 1 is a block diagram of the hardware architecture of a radar-guided vision system for determining whether a target vehicle in front of a host vehicle intends to change lanes, constructed in accordance with an embodiment of the present invention.

Referring now to FIG. 1, there is shown a radar-guided vision system 10, constructed according to an embodiment of the present invention. By way of a non-limiting example, the system 10 receives radar data from a radar system 12 and video from a camera 14, respectively. The camera 14 can be, for example, a digital camera such as a Guppy camera with a 640×480 CCD sensor and a 25 degree FOV lens. The system 10 can also include a computing platform 20. The computing platform 20 may include an embedded system (e.g., an Intel platform with DUO (1.83 Ghz) processor) comprising one or more processors 22 which includes a bus system 24 (e.g., an on board CAN bus system) which is fed by a video data stream 26 and a radar data stream 28 via the one or more processors 22 or directly to a computer-readable medium 29. The computer readable medium 28 can also be used for storing the instructions of the system 10 to be executed by the one or more processors 22, including an operating system, such as the Windows or the Linux operating system. The computer readable medium 29 can include a combination of volatile memory, such as RAM memory, and non-volatile memory, such as flash memory, optical disk(s), and/or hard disk(s). In one embodiment, the non-volatile memory can include a RAID (redundant array of independent disks) system configured at level 0 (striped set) that allows continuous streaming of uncompressed data to disk without frame-drops. In such a system, the processed video/radar data stream can be stored temporarily in the computer readable medium 29 for later output. The computer readable medium 29 can also comprise one or more databases to be described hereinbelow. Decision data for detecting that a target vehicle is in the lane of and ahead of a host vehicle and for determining if the target vehicle intends to change lanes can be output to vehicle control and driver awareness systems (VCAS) 30, such as Adaptive Cruise Control (ACC) and Forward Collision Warning (FCW) systems. Optionally, the decision data as well as the video from a camera 14 can be fed for display to the driver on an in-car monitor 32.

Figure 2:
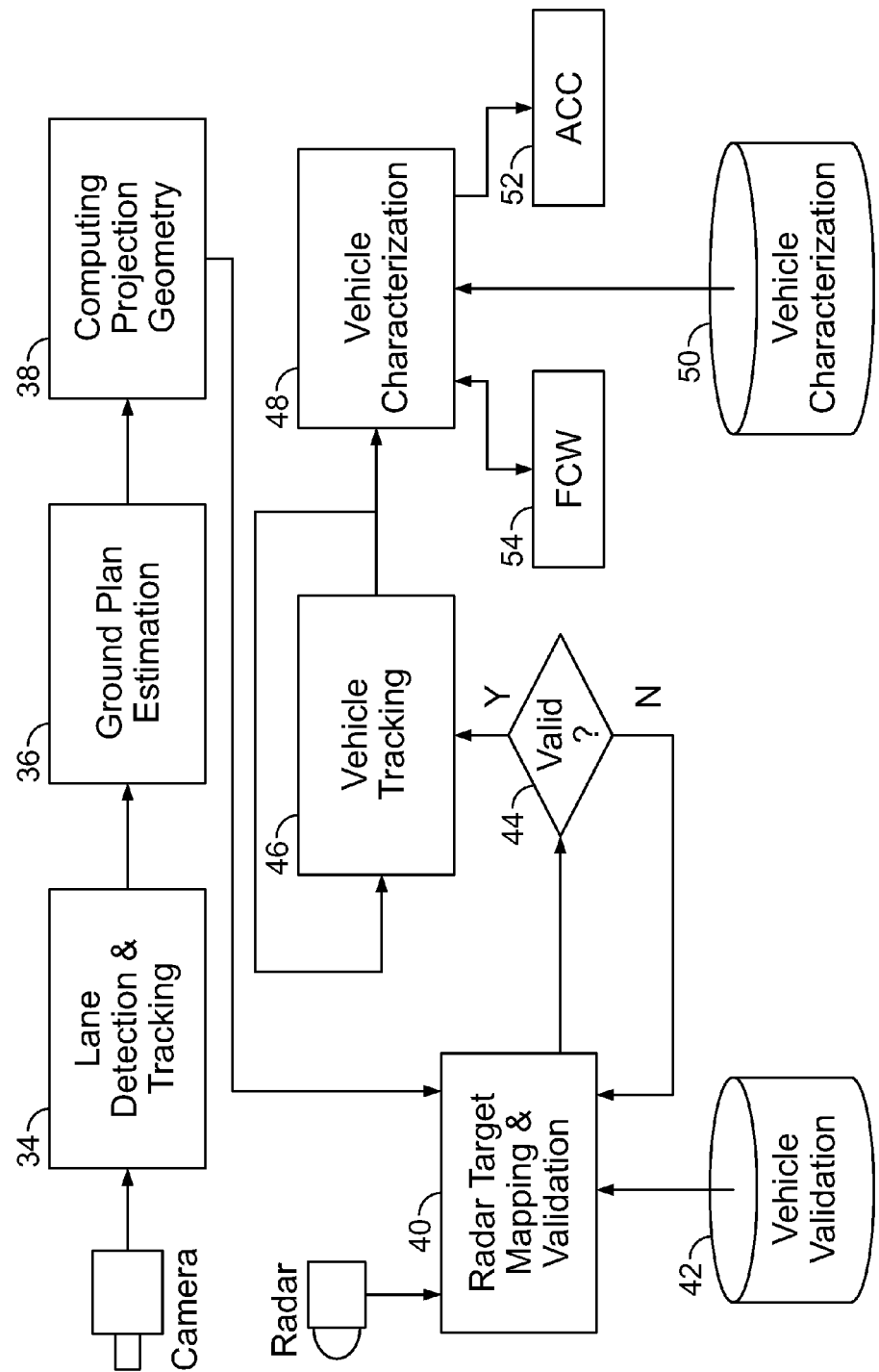
FIG. 2 is a block diagram of software architecture for implementing a method for determining whether a target vehicle in front of a host vehicle intends to change lanes associated with the system of FIG. 1.

Referring now to FIG. 2, a block diagram illustrating the software architecture of the present invention is depicted. In module 34, an image sequence from the camera 14 of FIG. 1 is processed for detecting the boundaries of the lane within which a host vehicle is driving and then the boundaries are tracked. In module 36, the ground plane is estimated by determining a projected vanishing point of the detected lane boundaries. In module 38, a camera projection matrix, updated by instant pitch and yaw angle changes, is used to project the radar target candidates (potential target vehicles) to image coordinates. In module 40, a target validation process is executed to determine if a target is a valid moving (or stationary) vehicle or an invalid object (other than vehicles) by using image cues from a vehicle validation data store 42. In module 44, if the target is determined to be a valid target vehicle, then in module 46, the valid target (vehicle) is then tracked by a vision algorithm. In module 48, the moving trajectory of the tracked vehicle and its appearance change are integrated with the aid of a vehicle characterization data store 50 used for characterizing the vehicle's moving pattern, i.e., to predict the lane change intention. The results from the characterization module are used by other intelligent vehicle sub-systems, such as ACC 52 or FCW 54.

Figure 3:
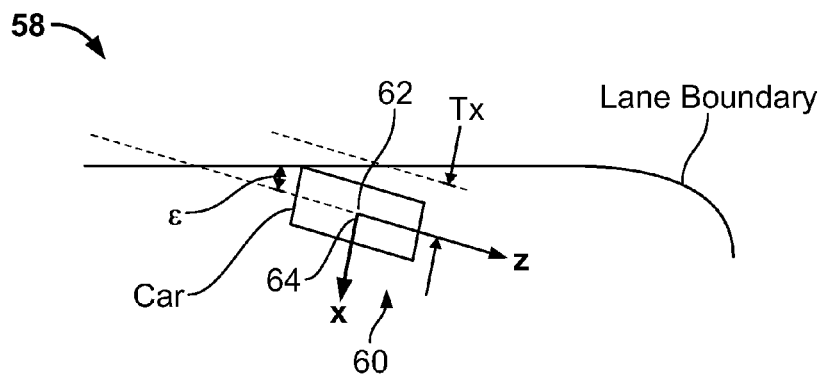
FIG. 3 is a diagram which models the road in front of a host vehicle.

The road in front of a host vehicle is modeled as shown in FIG. 3. A lane is defined as a stretch of the road with lane boundaries on either side. The lane boundaries 58 are simplified using a parabolic model as shown in Equation (1), in which x, z are distances from the axes in a coordinate system 60 centered on the car 62. The z-axis is along the moving direction of the car 62 and the x-axis is perpendicular to this moving direction. The y-axis is pointing into the ground (not shown).

$$x=f(z)=a+bz+cz^2 \quad (1)$$

The relation between the lane model and Equation (1) is as follows: $T_x=a$, which describes the distance of the lane boundary 58 from the origin 64 along the x-axis. $\epsilon=\tan^{-1}b$, which is the angle between the z-axis and the lane boundary 58. Item c is used to describe the curvature of the lane boundary 58. $x=f(z)$ gives us the offset of the lane boundary 58 along the z-axis at a certain distance.

Figure 4A:
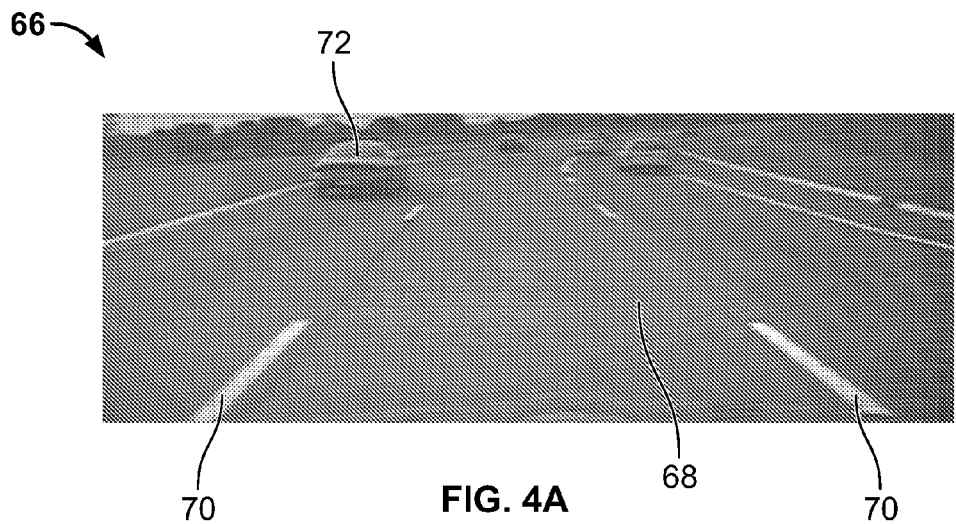
FIG. 4A shows an image of a road with lanes and traffic as would be "seen" by a host vehicle's imaging camera from which lane boundaries are to be detected.
Figure 4B:
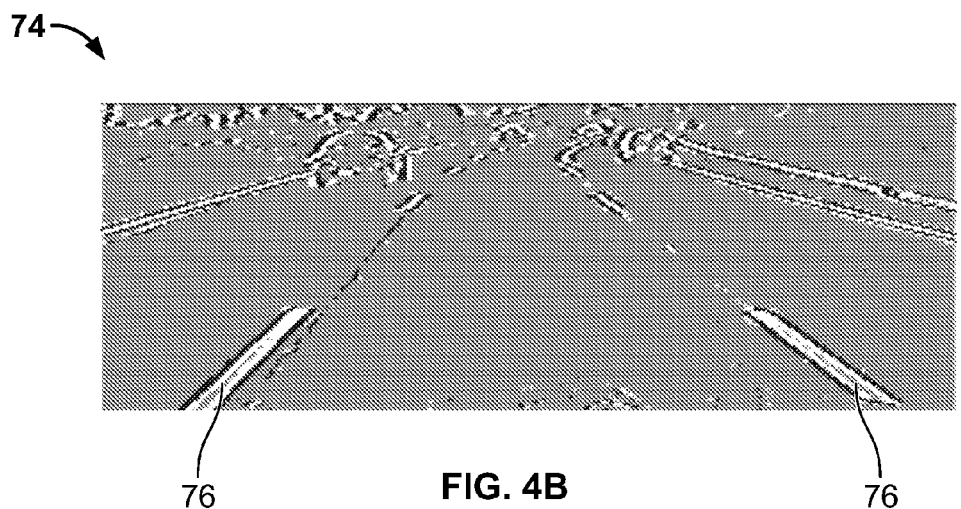
FIG. 4B is an image that results from applying operations to detect the lane boundaries of FIG. 4A.
Figure 5:
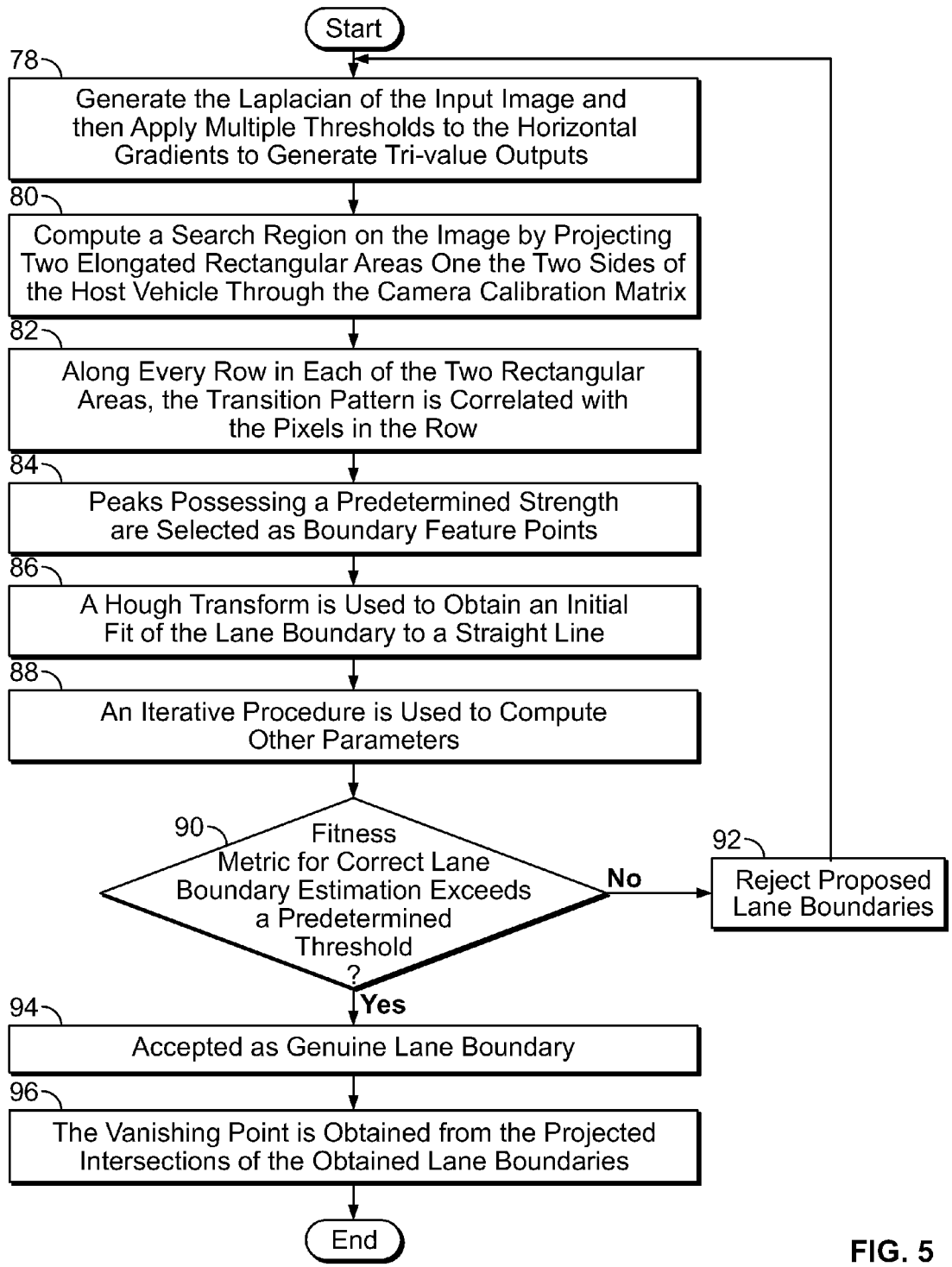
FIG. 5 is a flow chart of a method for determining lane boundaries of FIGS. 4A and 4B.

FIG. 4A shows an image 66 of a road 68 with lanes 70 and traffic 72 as would be "seen" by a host vehicle's imaging camera (not shown) from which lane boundaries are to be detected. The first step in lane boundary detection is to extract features from the image 66 that are possibly lane boundaries. Referring now to FIG. 4B and the accompanying flow chart of FIG. 5, at step 78, the Laplacian (second derivative) of the input image 66 is calculated and then multiple thresholds are applied to horizontal gradients to generate tri-value outputs. High positive gradients are mapped to white, high negative gradients are mapped to black, and the rest of the pixels are mapped to gray. The output of this operation on one sample image 66 is shown in FIG. 4B. In FIG. 4B, a transition pattern of gray-black-white-black-gray 76 can be seen in the output image 74 for pixels that correspond to lane markers. Referring again to FIG. 5, to extract pixels that fall within this transition pattern efficiently, at step 80, a search region in the image is computed by projecting two elongated rectangular areas one the two sides of the host vehicle through the camera calibration matrix. At step 82, along every row in each of the two rectangular areas, the transition pattern is correlated with the pixels in the row. At step 84, peaks possessing a predetermined strength are selected as boundary feature points.

At step 86, a Hough transform is used to obtain an initial fit of the lane boundary to a straight line and then, at step 88, an iterative procedure is used to compute other parameters in Equation (1). In doing so, an assumption is made that, within the distance of 20 meters from a host vehicle, the image of a lane boundary for most highway roads is close to a straight line. The validity of this assumption is determined by the fitting errors for both left and right lane boundaries. The quadratic term in Equation (1) is used to penalize lane width estimations that deviate considerably from the standard (3.6 m in most US highways). At step 90, it is determined whether the fitness metric for correct lane boundary estimation exceeds a predetermined threshold. If the predetermined threshold is not exceeded, then the hypothesis is most likely to correspond to non-lane-boundary features and is to be rejected at step 92. Steps 78-90 are repeated with another input image. At step 94, a hypothesis whose fitness is equal to or exceeds the threshold is accepted as genuine lane boundary, which is then used to initialize the lane tracking process. At step 96, the vanishing point is obtained from the projected intersections of the obtained lane boundaries.

Once an estimate of the lane boundary position is obtained, the lane boundary position is tracked from frame to frame. The position of the lane boundary estimated in the initialization phase along with velocity of the host vehicle and the rate of turning are used to initialize the lane tracker algorithm. Lane tracking is performed using two Kalman filters. The first filter predicts the position of the vehicle from estimates in the previous frame. This filter is called the Intraframe-Kalman filter as it conducts a prediction between frames. The second Kalman filter, called the Interframe-Kalman filter, incorporates the features within the current frame into the Intraframe-Kalman filter's estimate and improves upon the estimate. As a result, the tracking phase requires considerably fewer cycles than the lane boundary acquisition phase.

Figure 6:
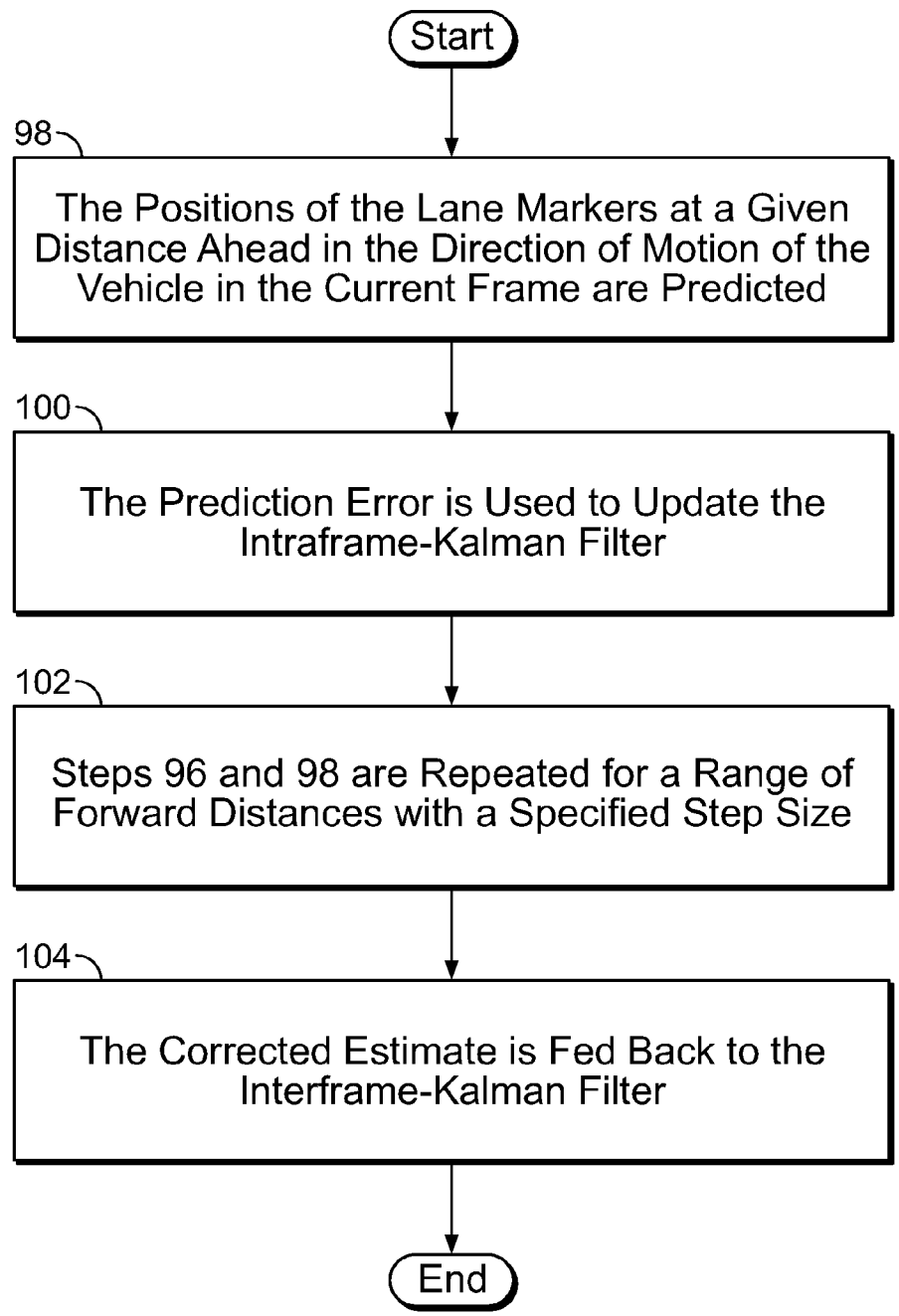
FIG. 6 is a flow chart of the operation of the Intraframe-Kalman filter used for tracking the lane boundaries of FIGS. 4A and 4B.

The operation of the Intraframe-Kalman filter is depicted in the flow chart of FIG. 6. From an initial estimate of the vehicles position, at step 98, the positions of the lane markers at a given distance ahead in the direction of motion of the vehicle in the current frame are predicted. These positions are determined (observation/measurement in Kalman filter terminology) from the feature-enhanced frame. At step 100, the prediction error is used to update the Intraframe-Kalman filter. At step 102, steps 98 and 100 are repeated for a range of forward distances with a specified step size. After incorporating all the features available in the searching area, at step 104, the corrected estimate is fed back to the Interframe-Kalman filter.

The vanishing point obtained from the lane boundaries is used to update the pitch angle of the camera, which is subsequently used to online update the camera projection matrix for radar-image mapping. Referring now to Equation 2 below, if θ is the pitch angle estimate, $C_y$ is image vertical center, $F_y$ is camera lens focal length and $V_y$ is the vertical position of the vanishing point, then $$\tan\theta = \frac{V_y - C_y}{F_y} \quad (2)$$

If $(V_{x1}, V_{y1})$ is the vanishing point in the previous frame and $(V_{x2}, V_{y2})$ is the vanishing point in the current frame, and $\Delta\theta$ is the incremental change in pitch angle, then $$\tan(\theta + \Delta\theta) = \frac{V_{y2} - V_{y1}}{f_y} \quad (3)$$

Solving this, the pitch angle change is:

$$\Delta\theta = \frac{V_{y2} - V_{y1}}{(1 - \tan^2\theta)f_y} \quad (4)$$

Figure 7A:
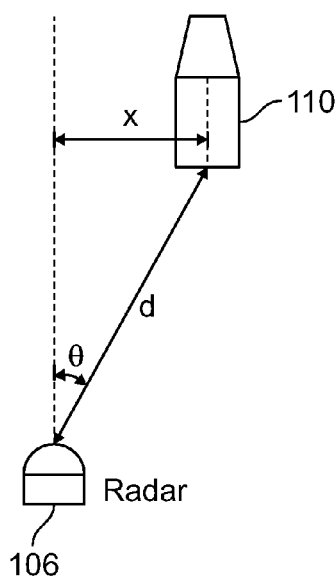
FIG. 7A is a schematic diagram depicting a radar target data representation in polar coordinates used in an algorithm for mapping radar targets to image coordinates.
Figure 7B:
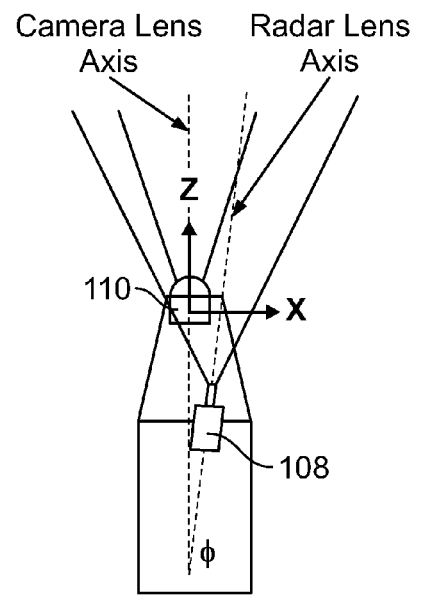
FIG. 7B is a schematic diagram depicting the 3D transformation between radar and a camera used for tracking lane boundaries.

As discussed above, the camera projection matrix is used to project the radar target candidates (potential target vehicles) to image coordinates. The algorithm for mapping radar targets to image coordinates is presented hereinbelow and with reference to FIGS. 7A and 7B. FIG. 7A is a schematic diagram depicting a radar target data representation in polar coordinates, while FIG. 7B depicts the 3D transformation between radar 106 and camera 108. For a radar target 110, both range d and offset x are provided in a polar coordinate system. Range is the distance from the radar 106 to the target 110; offset is the horizontal shift from radar heading direction to the target position. Angle θ between the range and heading direction is $\sin^{-1}(x/d)$, as shown in FIG. 6A.

As shown in FIG. 7B, a world coordinate system (X, Y, Z) is defined to represent the position of the radar 106 and the target vehicle 110. In the defined world coordinate system, ground is at Y=0. The position of the radar 106 is (X=0 Y=−$h_r$, Z=0). The X-axis points to right, Y-axis points down, and Z-axis points to the front. The offset from the radar 106 to the camera 108 is (Tx Ty Tz). The position of the camera 108 is (X=$T_x$ Y=−$h_r$−$T_y$ Z=−$T_z$). The rotation angle φ along Y-axis is the angle between the heading directions of the radar 106 and the camera 108. The heading direction of the radar 108 is shown as the fine dashed line 112, and the heading direction of camera 108 is shown as the coarse dashed line 114. The mapping of the position of the target 110 from the radar 106 to the camera 108 coordinates is shown in Equation 5 as $$X_C = [R]Xr + [T] \quad (5)$$

where, $$R = \begin{bmatrix} \cos\phi & -\sin\phi \\ \sin\phi & \cos\phi \end{bmatrix}$$

and $T = [Tx \; Ty \; Tz]^T$

In Equation 5, $X_C$ is the position of the target 110 in the coordinate system of the camera 108, $X_r$ is the position of the target 110 in the coordinate system of the radar 110, [R] is the rotation matrix derived from angle φ, and [T] is the translation vector between the radar 106 and the camera 108.

The mapping from the coordinates of the camera 108 to image coordinates is a perspective projection process; a 4×4 mapping matrix M is obtained through the calibration process and the pitch and yaw angle is updated in real-time. Overall, the mapping from radar coordinates to image coordinates is shown in equation (6) as $$[xy1]^T = MRd^*\sin\theta Y d^*\cos\theta 1]^T + M[T_X T_Y T_Z 1]^T \quad (6)$$

The radar 106 used here only provides point features for the target 110; it does not measure the height or width of the target 110, which is important information in mapping the target 110 to the image. A set of rules is used to infer the target's vertical position, as well as its width. For instance, if a target 110 is a moving vehicle, then it is inferred that the target 110 can only be moving on the ground, thus the vehicle's bottom position is at Y=0. If a target's lateral position is outside of the lane boundaries, it is inferred that the target 110 could be (a) a vehicle parked on roadside if it is a stationary target; thus it's bottom position is at Y=0; (2) other non-vehicle objects on ground (e.g. poles, trees, and etc.); thus it's bottom is at Y=0; and (3) other non-vehicle objects above the ground (e.g. road signs); thus the position of its bottom Y<0. Similarly, if the radar 106 detects a stationary target inside the lane, and meanwhile the radar 106 also detects another moving vehicle in the same lane, then it is inferred that this stationary target must be above the ground, which could be an overpass, a road sign, or a traffic light fixture.

When mapping a radar target to image coordinates, it is assumed that its real size is 2 m×2 m. Then a plus 50% margin window for a target search and validation is added.

Figure 8A:
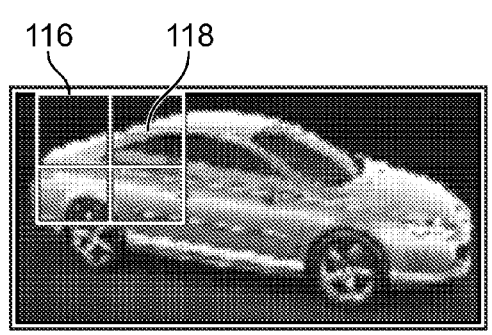
FIG. 8A shows a chosen sub-region (image patch) for a target vehicle.
Figure 8B:
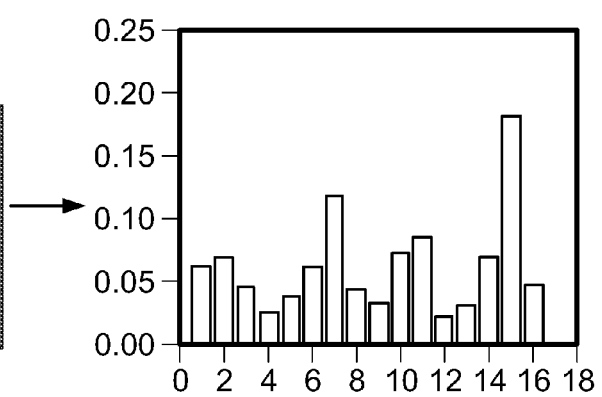
FIG. 8B is the resulting histogram of oriented gradient (HOG) for the sub-region of FIG. 8A.

Once a target vehicle is identified, a classifier is created for vehicle validation. To build a classifier for vehicle validation, a histogram of oriented gradient (HOG) representation as described in N. Dalal and B. Triggs, "Histograms of oriented gradients for human detection," *Proc. CVPR*, volume 1, pages 886-893, 2005, is used in an extended form by means of employing support vector machines (SVM) as the classifier. An extended HOG is superior to the standard HOG by grouping only perceptually similar images together. With a support vector machine, a decision function results that discriminates object and non-object patterns reliably in images under different kinds of conditions. A HOG feature is created by first computing the gradient magnitude and orientation at each image sample point in a region around an anchor point. The region is split into N×N sub-regions. An orientation histogram for each sub-region is then formed by accumulating samples within the sub-region, weighted by gradient magnitudes. Concatenating the histograms from all the sub-regions gives the final HOG feature vector as illustrated in FIGS. 8A and 8B, wherein FIG. 8A shows a chosen sub-region (image patch) 116 for a target vehicle, and FIG. 8B is the resulting HOG for the sub-region 116. The HOG is then extended by incorporating spatial locality.

Standard HOG only encodes the gradient orientation of one image patch, no matter where in the image patch the orientation originates. To incorporate spatial properties in an HOG feature, one distance dimension is added to an angle dimension in the binning of all the pixels within each sub-region (image patch) as shown in FIGS. 8A and 8B, wherein the sub-region 116 of FIG. 8A is sub-divided into a plurality of cells 118 for binning, and the resulting HOG gradient orientations (direction ranges) and distances from centers for binning is shown in FIG. 8B. For each of the cells 118, a local 1-D histogram of gradient directions over the pixels of the cell 118 is accumulated. The combined histogram entries form the representation. For better invariance to illumination, shadowing, etc., it is also useful to contrast-normalize the local responses before using them. This can be done by accumulating a measure of a local histogram over somewhat larger spatial regions (or blocks) and using the results to normalize all of the cells 118 in a sub-region 116.

The extended HOGs are fed to a support vector machine (SVM), the SVM being used as the classifying function to make a decision as to whether a target vehicle is a valid. The Support Vector Machine (SVM) is a statistical learning method based on the structure risk minimization principle. In a binary classification case, the objective of the SVM is to find a best separating hyperplane with a maximum margin. The form of a SVM classifier is:

$$y = \text{sign}\left(\sum_{i=1}^{N} y_i \alpha_i K(x, x_i) + b\right) \quad (7)$$

where x is the feature vector of an observation example, $y \in \{+1, -1\}$ is a class label, $x_i$ is the feature vector of the $i^{th}$ training sample, N is the number of training samples, and $k(x, x_i)$ is the kernel function. Through the learning process, $\alpha = \{\alpha_1, \alpha_2, \ldots, \alpha_N\}$ is computed.

One distinct advantage of the SVM type of classifier over traditional neural networks is that an SVM has better generalization performance. While neural networks such as multiple layer perceptrons (MLPs) can produce low error rate on training data, there is no guarantee that this will translate into good performance on test data. Multiple layer perceptrons minimize the mean squared error over the training data (empirical risk minimization), whereas SVMs use an additional principal called structural risk minimization. The purpose of structural risk minimization is to give an upper bound on the expected generalization error.

Vehicle motion characterization involves the step of predicting the lane change intensions of a valid target vehicle. Unfortunately, predicting the lane change intentions of a valid target vehicle is a complex decision making process, which is affected by a driver's behavior, the vehicle's speed, acceleration and steering angle, road conditions, and traffic patterns. A simple thresholding method using the position offset of the valid target vehicle to the lane boundaries (e.g., if the offset is below some threshold, the target vehicle is classified as changing lane) cannot work since some drivers may drive next to one side of a lane for a long time without changing lanes. In addition, such a method can only work when a lane changing event happens, and cannot predict the event before it happens.

In the present invention, the lane change intentions of a valid target vehicle is inferred based on pattern recognition. Given a numbers of features of the target vehicle, lane change intentions (either left or right) and staying in a lane are classified. The choice of features is a key step in the classification task. In the present invention, lane change intensions can be classified based on motion cue and appearance cue of the target vehicle.

Figure 9A:
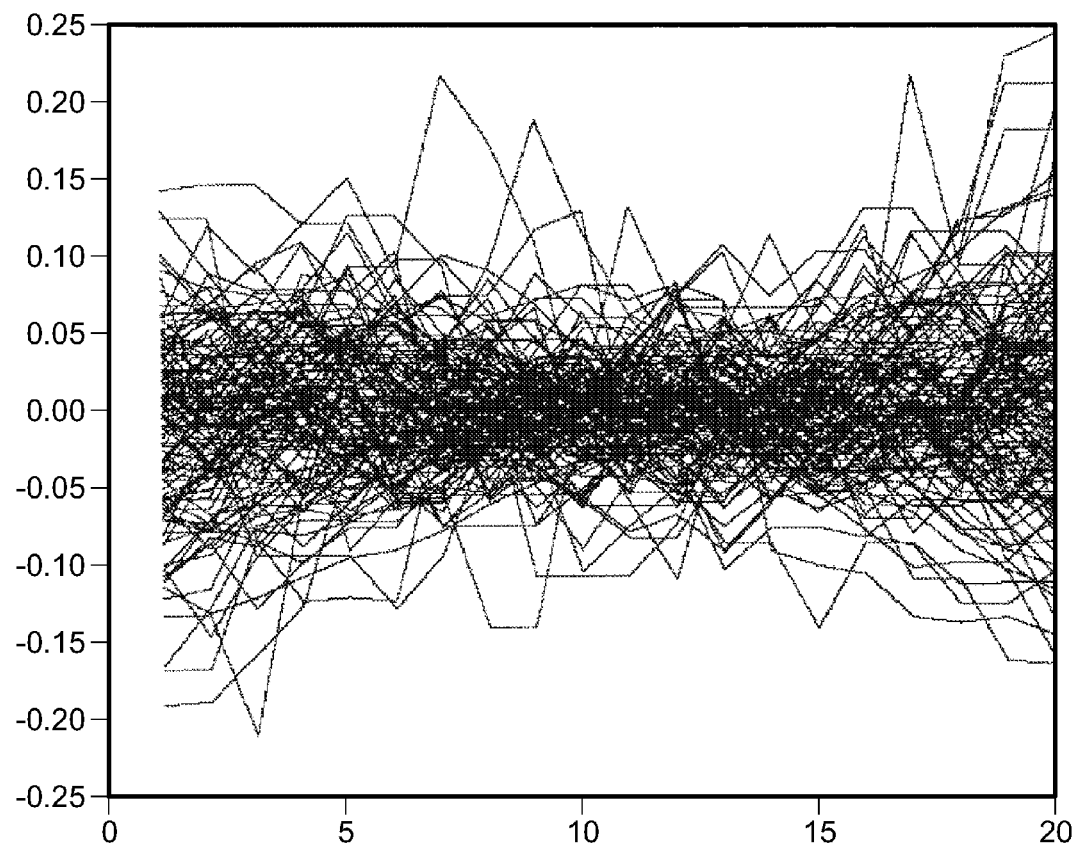
FIG. 9A depicts plots of vehicle motion trajectories when a target vehicle stays in the lane.
Figure 9B:
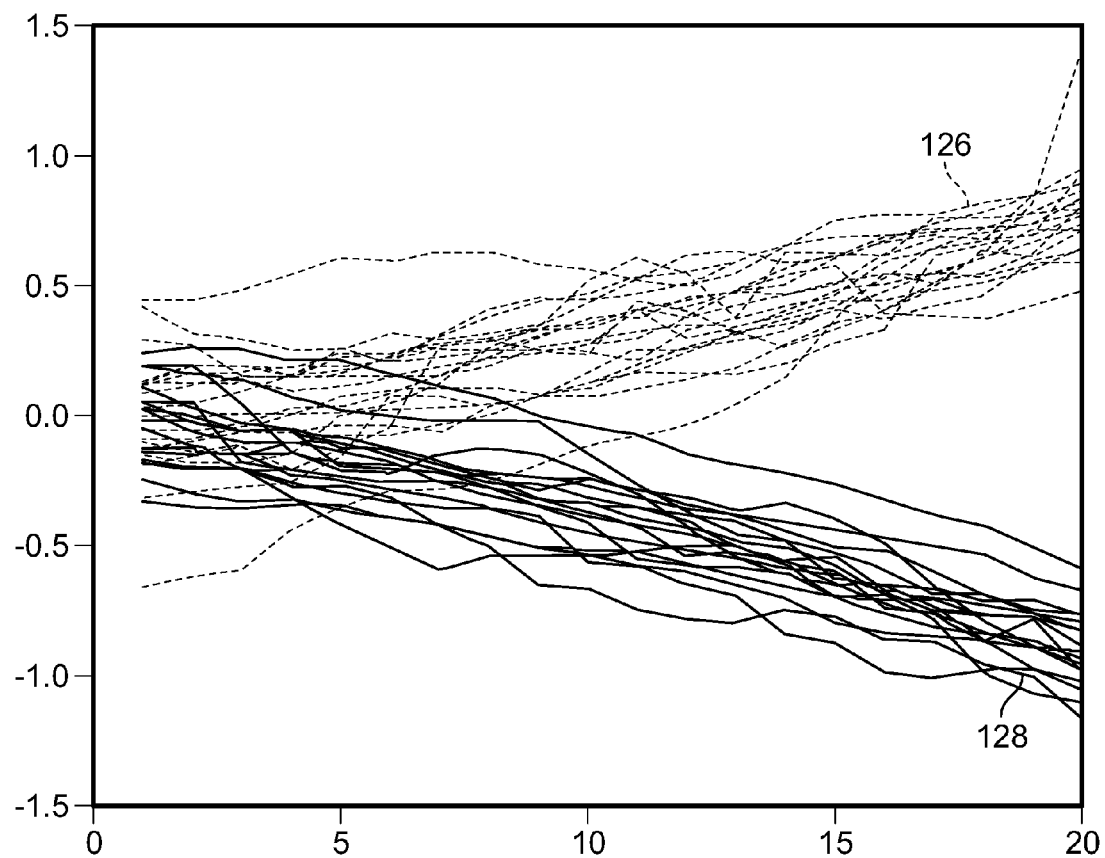
FIG. 9B depicts plots of vehicle motion trajectories when the target vehicle changes lanes to the right lane (tilting upward) and the left lane (tilting downward)

After detecting lane boundaries and detecting and tracking a target vehicle, motion cue can be used to classify the lane change intentions of the target vehicle. In motion cue, lane change intentions are deduced from vehicle motion trajectory relative to the center of a lane. More specifically, when the target vehicles intends to change lanes, its relative distance from the lane center tends to follow specific patterns or trends as illustrated in FIGS. 9A and 9B. FIG. 9A shows plots of vehicle motion trajectories when a target vehicle stays in the lane (scaled up to show small variations). FIG. 9B shows plots of vehicle motion trajectories when the target vehicle changes lanes to the right lane 126 (tilting upward) and the left lane 128 (tilting downward).

Figure 10:
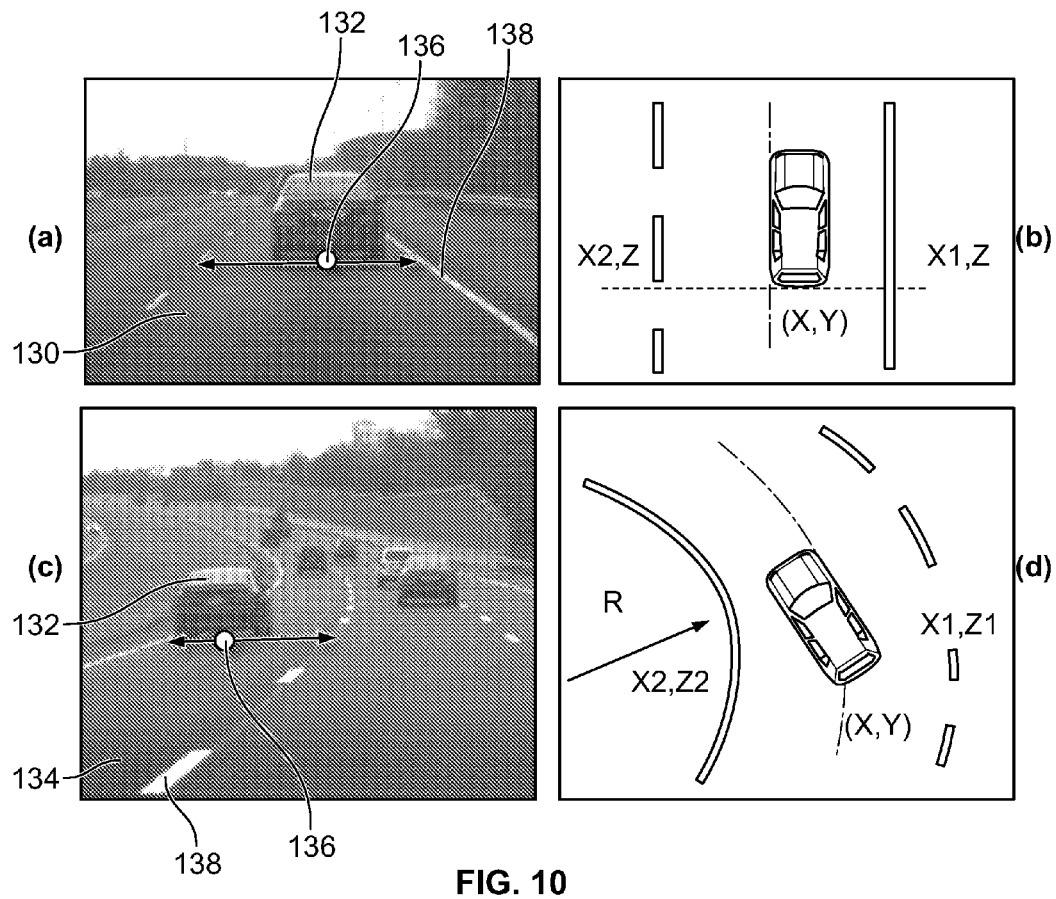
FIG. 10A shows a target vehicle in a lane on a straight road with the central bottom of the vehicle defining the position of the target vehicle.
FIG. 10B is a schematic diagram of the target vehicle of FIG. 10A mapped to world coordinates.
FIG. 10C shows a target vehicle in a lane on a curved road with the central bottom of the vehicle defining the position of the target vehicle.
FIG. 10D is a schematic diagram of the target vehicle of FIG. 10C mapped to world coordinates.

Referring now to FIGS. 10A and 10C, the central bottom 130 is defined as the position of a tracked target vehicle 132. In the present invention, the position 130 of a tracked target vehicle 132 and the lane boundaries 134 are mapped to 3D for a trajectory computation. The position 130 of a tracked target vehicle 132 is calculated with respect to the center 136 of a lane 138.

For the case of a straight line road as shown in FIGS. 10A and 10B, the position of the bottom of a vehicle (x, y) in FIG. 10A is mapped to world coordinates (X, Y) in FIG. 10B. If a horizontal line is drawn through this point, the line will intercept the lane boundaries at location X1 and X2, at the same distance Z. The lane center location is ((X1+X2)/2, Z). The vehicle's trajectory position with respect to the lane center is calculated to be (X−(X1+X2)/2, Z). For the curved lane case of FIGS. 10C and 10D, the position of the bottom of the vehicle (x, y) in FIG. 10C is mapped to world coordinates (X, Y) in FIG. 10D. Since the pose of the vehicle is parallel with the lane curvature (1/R), the intercepting line now needs to be rotated 1/R°, which intercepts with the lane boundaries at (X1, Z1) and (X2, Z2), where Z1 and Z2 are different. The lane center location is ((X1+X2)/2, (Z1+Z2)/2). The vehicle's position, with respect to the lane center is calculated to be (X−(X1+X2)/2, Z−(Z1+Z2)/2).

Appearance cue, in addition to motion cue, can be used to classify the lane change intentions of the target vehicle. In appearance cue, lane change intentions are deduced from vehicle appearance changes relative to a tracking template. When a valid target vehicle intends to change lane, the appearance of the rear part of the vehicle changes due to rotation. To represent the appearance change, tracking results are used. In the present invention, the Kanade-Lucas-Tomasi Feature Tracker (␣LT) is used for tracking a valid target vehicle. KLT minimizes the following error between a pre-established template and a sub-region in the current frame:

$$E(p) = \sum_{x} [I(W(X; p + \Delta p)) - T(x)]^2 \quad (8)$$

where warping parameter $p = (p_1, P_2, P_3, P_4, P_5, P_6)$ represents the transformation from the template to the sub-region in the image, W(x;p) is the warping function, and T(x) is a template. The appearance relationship between the currently tracked valid target vehicle and the template is encoded in the warping parameters, which can be used as the representation for appearance change during the lane changing process. As in vehicle validation, SVM is used as the classification function to build a vehicle lane change characterization classifier. The resulting classifier is used to examine a plurality of video frames to determining if a valid tracked target vehicle intends to change lanes.

Vehicle characterization (i.e., lane change intentions) depends on the measurement of trajectory of position offsets of the target vehicle from the lane center. To determine the offset, two data points need to be calculated: the center position of the target vehicle and the center position of the lane. The center position of the target vehicle can be obtained from a tracked vehicle bounding box. The center position of the lane can be calculated from the lane boundaries. In the situation where the lane boundaries are poor or there are no lane boundaries, then the offset of a target vehicle with respect to the center of a lane cannot be easily determined.

Figure 11:
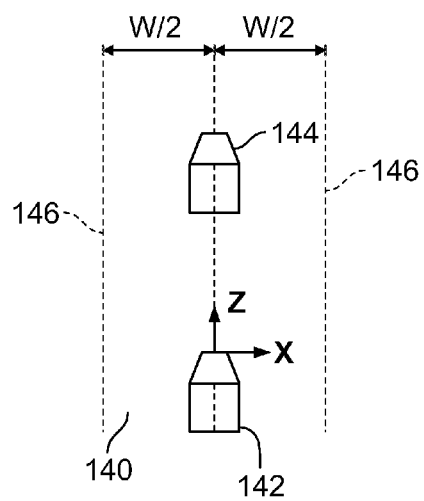
FIG. 11 is a schematic diagram of a virtual lane, as well as its relative position to a host vehicle and a target vehicle.

To overcome this problem, the concept of a virtual lane and virtual boundary is introduced in the situations where lane boundaries are hard to obtain. FIG. 11 shows a virtual lane 140, as well as its relative position to a host vehicle 142 and a target vehicle 144. Once a virtual lane 140 is established, the offset of the tracked target vehicle 144 can be calculated from the center of the virtual lane 140. The concept of using a virtual lane 140 is based on the following observations: (1) when there are no lane markers for a lane departure warning module (LDW) to track, the pre-calibrated camera model can be used to calculate the relative position of the tracked target vehicle 144 to the host vehicle 142; (2) it can be assumed that when a target vehicle 144 is detected and tracked, the target vehicle 144 is near the middle of the "lane", and this can be verified by looking at the offset data from Radar; (3) from (1) and (2), a virtual reference coordinate system can be established as shown in FIG. 11 in which the host vehicle 142 is located at the origin, and the tracked target vehicle 144 is at (X=0, Y=0, Z=d). The Z-axis is the extension from the host vehicle 142 to the target vehicle 144. Based on the virtual reference coordinates, the virtual lane 140 can be created; the virtual lane 140 is represented by two straight lines 146, parallel to the Z-axis in virtual coordinate system, and centered on Z-axis. The width of the virtual lane W, is defined according to the highway standard, e.g., W=3.6 m for a US standard highway.

Since the virtual lane 140 is built on the position of the tracked target vehicle 144, obtaining a stable position of the tracked target vehicle 144 plays an important role in the process. To obtain good vehicle tracking position, a short tracking trajectory of the target vehicle 144 is stored and analyzed. The mean $\eta_x$ and standard deviation $\sigma_x$ of the tracking positions are calculated. Under the condition that $\sigma_x < T_x$, the virtual lane center, as well as two virtual boundaries 146, are calculated as shown in Eq. 9. Here, the threshold $T_x$ is determine from experiment (on the order of about 0.15).

$$Xc = -\eta_x$$

$$Lx = Xc - W/2.$$

$$Rx = Xc + W/2. \quad (9)$$

The continued tracking of the target vehicle on the virtual lane will result in a new tracking position $x_{ti}$ on each frame i, the offset $\Delta x_i$ with respect to the virtual lane center, is calculated, as shown in Equation 10. The queued sequence of $\Delta x_i$ is fed into the classifier for vehicle moving pattern characterization.

$$\Delta x_i = x_{ti} - (Lx + Rx)/2. \quad (10)$$

In the case where tracking of the target vehicle 144 becomes lost, the virtual lane 140, established in Equation 9, can be continually maintained for a short time of period (on the order of about 2 seconds). If within this period of time the target vehicle 144 is again picked up and tracked, the new offsets will be calculated on the currently maintained virtual lane 140 and boundaries 146. If the target vehicle 144 can not be re-tracked within this period of time, the virtual lane 140 will be reset and will be re-established when the target vehicle 144 is later tracked.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for determining whether a target vehicle in front of a host vehicle intends to change lanes using radar data and image data, comprising the steps of:
   processing the image data to detect boundaries of a lane of the host vehicle;
   estimating a ground plane by determining a projected vanishing point of the detected lane boundaries;
   using a camera projection matrix to map the target vehicle from the radar data to image coordinates; and
   determining lane change intentions of the target vehicle based on the target vehicle motion trajectory relative to the center of the lane such that the relative distance of the target vehicle from the center of the lane follows a predetermined trend.

2. The method of claim 1, further comprising the step of tracking the target vehicle, wherein said step of determining lane change intentions based on an appearance change of the target vehicle is based on a template that tracks changes to the appearance of the rear part of the target vehicle due to rotation.

3. The method of claim 2, wherein the Kanade-Lucas-Tomasi Feature Tracker (KLT) is used for tracking the target vehicle.

4. The method of claim 2, wherein said step of determining lane change intentions based on an appearance change of the target vehicle further comprises the steps of:
   encoding an appearance relationship between the tracked target vehicle and the template in warping parameters;
   feeding the warping parameters to a support vehicle machine (SVM); and
   using the SVM to classify the target vehicle as intending to change lanes or not intending to change lanes.

5. The method of claim 1, further comprising the step of creating a virtual lane and virtual lane boundaries when real lane boundaries cannot be obtained.

6. The method of claim 1, wherein said step of processing the image data to detect the boundaries of a lane of the host vehicle further comprises the steps of:
   (a) extracting features from at least one image of the image data that represent potential lane boundaries;
   (b) calculating the Laplacian of the at least one image and applying multiple thresholds to horizontal gradients to generate tri-value outputs, wherein high positive gradients are mapped to white, high negative gradients are mapped to black, and remaining pixels are mapped to gray;
   (c) computing a search region in the image by projecting two elongated rectangular areas one the two sides of the host vehicle through a camera calibration matrix;
   (d) along every row in each of the two rectangular areas, correlating a transition with the pixels in the row;
   (e) selecting peaks possessing a predetermined strength as boundary feature points;
   (f) using a Hough transform to obtain a proposed fit of the lane boundaries to a straight line;
   (g) determined whether a fitness metric for a correct lane boundaries estimation exceeds a predetermined threshold; and
   (h) repeating steps (a)-(g) if the predetermined threshold is not exceeded, otherwise a accepting the proposed fit as genuine lane boundaries.

7. The method of claim 6, wherein the projected vanishing point of the detected lane boundaries is determined from the projected intersections of the accepted lane boundaries.

8. The method of claim 1, further comprising the step of tracking the boundaries of the lane.

9. The method of claim 8, wherein said step of tracking the boundaries of the lane further comprise the steps of:
  using an Intraframe-Kalman filter to predict the position of the target vehicle in a current frame from estimates of lane boundaries in a previous frame; and
  applying an Interframe-Kalman filter to incorporate features within the current frame into the Intraframe-Kalman filter's estimate.

10. The method of claim 1, further comprising the step of determining whether the target vehicle is a valid vehicle.

11. The method of claim 10, further comprising the steps of:
  representing the target vehicle using a histogram of oriented gradient (HOG) representation;
  feeding the HOG representation to a support vehicle machine (SVM); and
  using the SVM to classify whether the target vehicle is a valid target vehicle.

12. The method of claim 11, wherein said step of representing the target vehicle using a histogram of oriented gradient (HOG) representation further comprises the steps of:
  computing the gradient magnitude and orientation at each image sample point in a region around an anchor point;
  splitting the region into N×N sub-regions;
  forming an orientation histogram for each sub-region by accumulating samples within the sub-region, weighted by gradient magnitudes;
  concatenating the histograms from all the sub-regions into a final HOG feature vector; and
  extending the HOG by incorporating spatial locality.

13. The method of claim 12, wherein spatial locality is incorporated by the steps of:
  adding one distance dimension to an angle dimension in the binning of all the pixels within each sub-region;
  accumulating a local 1-D histogram of gradient directions over the pixels of a cell; and
  combining the histogram entries to form an extended HOG representation.

14. A system for detecting whether a target vehicle in front of a host vehicle intends to change lanes, comprising:
  a camera for receiving image data;
  a radar system for receiving radar data; and
  a processor communicatively connected to said camera and said radar system, said processor being configured for:
    processing the image data to detect boundaries of a lane of the host vehicle;
    estimating a ground plane by determining a projected vanishing point of the detected lane boundaries;
    using a camera projection matrix to map the target vehicle from the radar data to image coordinates; and
    determining lane change intentions of the target vehicle based on the target vehicle motion trajectory relative to the center of the lane such that the relative distance of the target vehicle from the center of the lane follows a predetermined trend.

15. The system of claim 14, further comprising the step of tracking the target vehicle, wherein said step of determining lane change intentions based on an appearance change of the target vehicle is based on a template that tracks changes to the appearance of the rear part of the target vehicle due to rotation.

16. The system of claim 14, wherein the step of determining lane change intentions based on an appearance change of the target vehicle further comprises the steps of:
  encoding an appearance relationship between the tracked target vehicle and the template in warping parameters;
  feeding the warping parameters to a support vehicle machine (SVM); and
  using the SVM to classify the target vehicle as intending to change lanes or not intending to change lanes.

17. A non-transitory computer-readable medium carrying one or more sequences for determining whether a target vehicle in front of a host. vehicle intends to change lanes using radar data and image data, wherein execution of the one of more sequences of instructions by one or more processors causes the one or more processors to perform the steps of:
  processing the image data to detect boundaries of the lane of the host vehicle;
  estimating a ground plane by determining a projected vanishing point of the detected lane boundaries;
  using a camera projection matrix to map the target vehicle from the radar data to image coordinates; and
  determining lane change intentions of the target vehicle based on a template that tracks changes to the appearance of the rear part of the target vehicle due to rotation.

18. The computer readable medium of claim 17, wherein the step of determining lane change intentions based on a moving trajectory of the target vehicle is based on vehicle motion trajectory relative to the center of the lane such that the relative distance of the target vehicle from the center of the lane follows a predetermined trend.

19. The computer readable medium of claim 17, wherein the step of determining lane change intentions based on an appearance change of the target vehicle further comprises the steps of:
  encoding an appearance relationship between the tracked target vehicle and the template in warping parameters;
  feeding the warping parameters to a support vehicle machine (SVM); and
  using the SVM to classify the target vehicle as intending to change lanes or not intending to change lanes.

* * * * *